Aug. 28, 1956  E. L. CIRESE  2,760,820
APPLICATOR FOR WATER SOLUBLE FERTILIZERS,
FUNGICIDES, INSECTICIDES, AND THE LIKE
Filed June 30, 1954  2 Sheets-Sheet 1
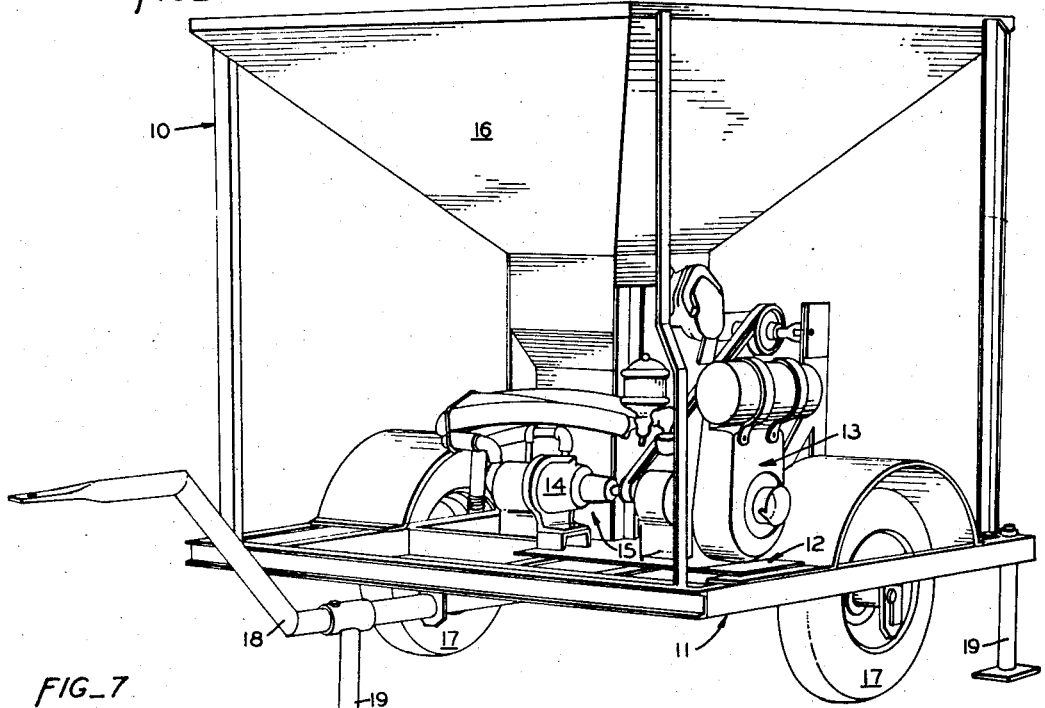
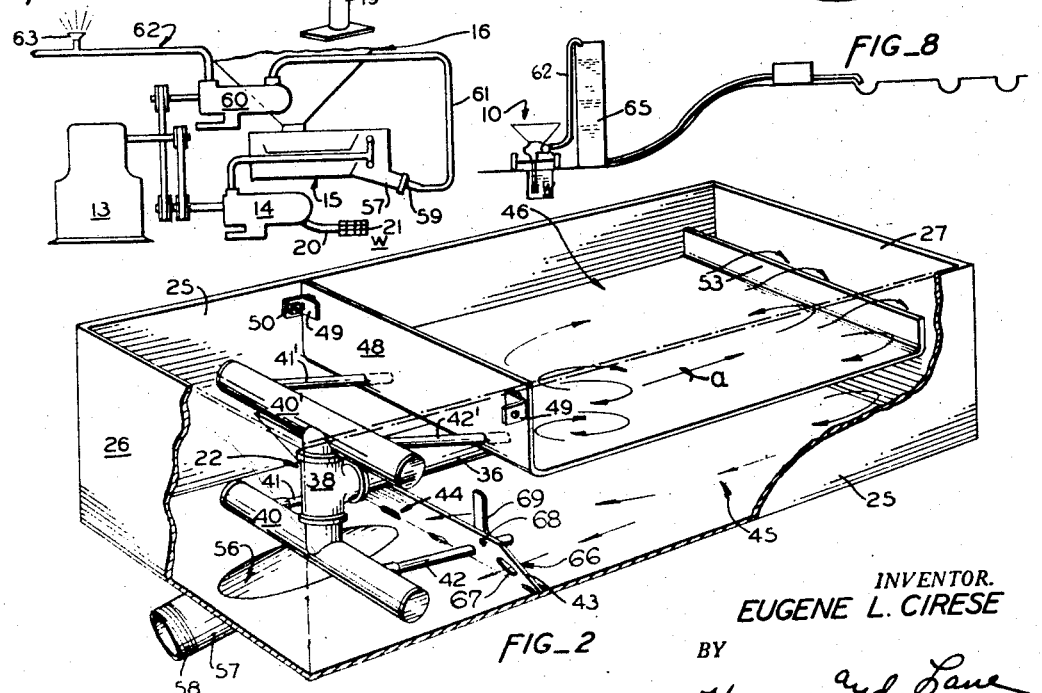
INVENTOR.
EUGENE L. CIRESE
BY
Hansen and Lane
ATTORNEYS Aug. 28, 1956 E. L. CIRESE 2,760,820
APPLICATOR FOR WATER SOLUBLE FERTILIZERS,
FUNGICIDES, INSECTICIDES, AND THE LIKE
Filed June 30, 1954 2 Sheets-Sheet 2
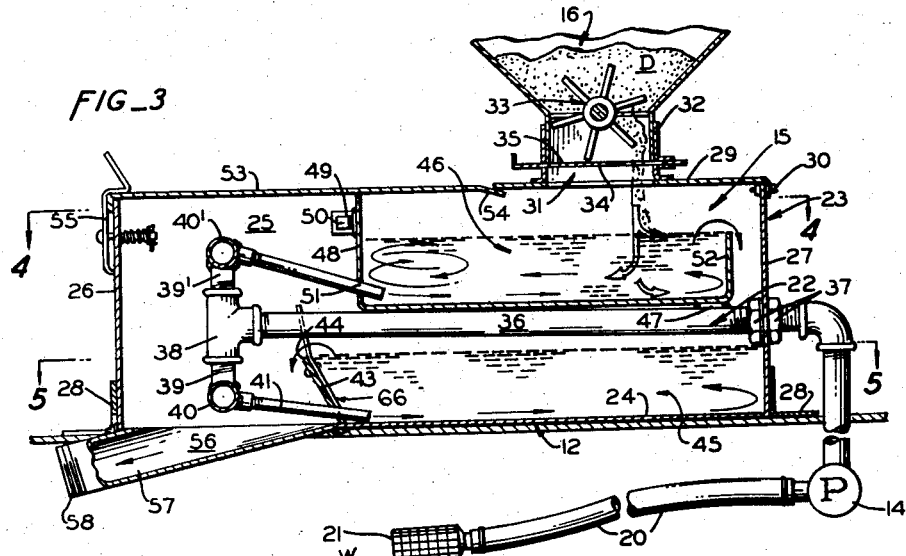
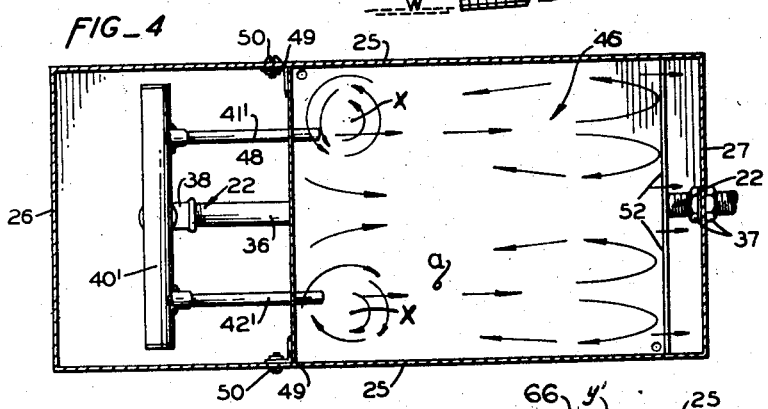
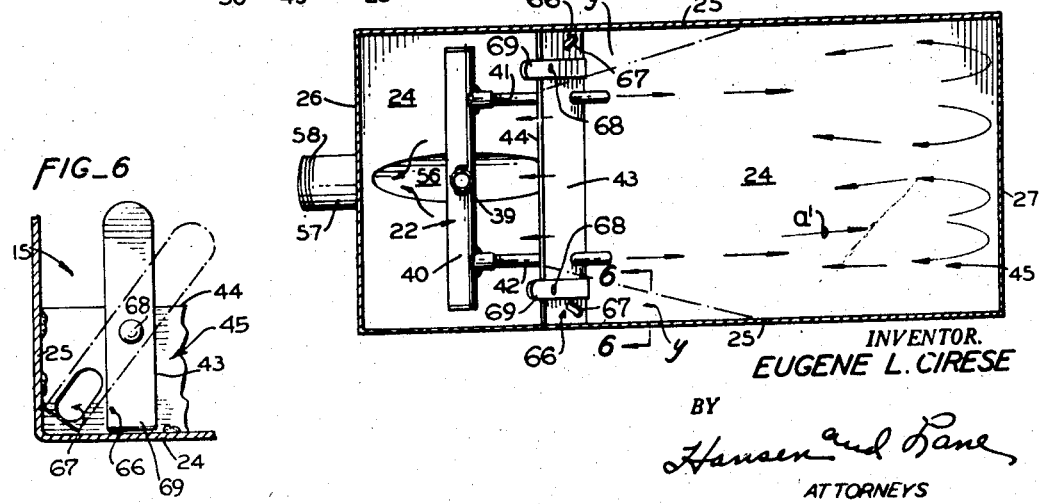
INVENTOR.
EUGENE L. CIRESE
BY
Hansen and Lane
ATTORNEYS

United States Patent Office 2,760,820
Patented Aug. 28, 1956

2,760,820

APPLICATOR FOR WATER SOLUBLE FERTILIZERS, FUNGICIDES, INSECTICIDES, AND THE LIKE

Eugene L. Cirese, San Jose, Calif., assignor to Nu-Way Harvester Company, Chicago, Ill., a copartnership Application June 30, 1954, Serial No. 440,383

6 Claims. (Cl. 299—83)

This invention relates to applicators and more particularly to apparatus of this general class for introducing measured quantities of soluble fertilizers, fungcides and insecticides and the like into a flow of water for admixture therewith and dilution therein.

More specifically this invention relates to a novel mixing chamber embodied in the aforementioned class of apparatus for assuring prompt and full dilution of a stream of water as it flows through the same.

It is common practice to admix many water soluble as well as liquid fertilizers or the like with a flowing stream of water for conveyance thereby and therewith into irrigation ditches, sprinkler systems or forced feed spray equipment. The present invention contemplates the provision of a compact, mobile or portable unit easily embodied in such systems or equipment to attain maximum benefit from such water soluble fertilizers, fungicides or insecticides.

In connection with the foregoing, it is an object of this invention to provide a compact portable apparatus for admixing water soluble dry or liquid substance into a stream of water for conveyance and application thereby to crops.

Another obpect is to provide an applicator for water soluble fertilizer or the like in which measured quantities of the latter converge with a flow of water within a mixing chamber incident to discharge therefrom.

These and other objects and advantages of the present invention will be made apparent from a reading of the following description in the light of the drawings in which:

Fig. 1 is a perspective view of a fertilizer applicator embodying the present invention.

Fig. 2 is a perspective view of the mixing chamber embodied in the fertilizer applicator of Fig. 1, partially broken away for purposes of illustration.

Fig. 3 is a longitudinal section through the mixing chamber of Fig. 2 in juxtaposition with other parts of the applicator of Fig. 1.

Fig. 4 is a plan view of the upper zone of the mixing chamber of Fig. 3 and taken substantially along line 4—4 thereof.

Fig. 5 is a plan view of the lower zone of the mixing chamber of Fig. 3 and taken substantially along line 5—5 thereof.

Fig. 6 is a fragmentary detail of a flow gate illustrated in Fig. 5 and as seen from line 6—6 thereof.

Fig. 7 is a diagrammatic layout of the mixing chamber in situ relative to other elements of the applicator shown in Fig. 1 and showing a booster pump at the discharge side of the chamber.

Fig. 8 is a schematic diagram showing the applicator of Fig. 1 supplying a stand pipe for irrigating at higher levels.

In the drawings, the applicator, generally designated 10, comprises a frame 11 having a platform 12 on which a self-contained motor 13 is mounted for driving a pump 14 for forcing water into a mixing chamber 15 also mounted on the platform 12 below a hopper 16 from which soluble substance gravitates into the mixing chamber 15.

In Fig. 1, the frame 11 is shown provided with wheels 17 and a shaft 18 to afford mobility to the applicator unit. However, it should be understood that the frame 11 can be provided with skids (not shown) for the same purpose. If desired the entire applicator 10 can be permanently located near a source of water by placing the platform 12 on a suitable foundation. In either event the frame 11 must be firmly supported during operation of the motor 13 and the several elements driven thereby and to this end suitable jacks 19 are provided at the fore and aft sides of the platform to establish firm connection with the earth.

In general the applicator 10 is intended for use in supplementing the beneficial effects of irrigation water upon plants incident to tranmission of such water through irrigation ditches. However, the device is likewise useful in admixing measured quantities of water soluble chemicals and/or elements to a stream of water incident to flowage into pipe lines or conduits having spray nozzles or orifices for overhead watering or spraying of plants, trees and vegetation.

In this connection it should be understood that the applicator 10 is preferably placed near a source of water W which may be the conventional pipe line from a municipal or community water supply having the usual water pressure. In the drawings, however, I have shown a suction pump 14 provided with an intake line 20 with a screened end 21 adapted to be submerged in a natural stream or river bed, a reservoir, or an irrigation ditch at the point of reception of irrigation water from a flume or supply end of a well or reservoir supply line. This suction pump 14 draws water from a source of supply W and discharges such water at approximately 20# pressure and at rate of substantially 14 gallons per minute to an intake manifold 22 embodied in the mixing chamber 15.

The mixing chamber 15 is preferably provided by a rectangular box-like jacket 23 having a bottom 24, side walls 25 and fore and aft end walls 26 and 27 respectively. The bottom 24 rests on the platform 12 and is secured in place thereon between suitable angle iron supports 28. The upper end of the jacket 23 is provided with a stationary cover 29 over its intake end, i. e., adjacent the aft wall 27 thereof. This partial stationary cover 29 is secured on the jacket 23 by suitable nuts and bolts 30 and has an opening 31 formed therethrough aligned with a throat 32 which telescopically receives the discharge end of the hopper 16.

The discharge end of the hopper 16 has an agitator paddle 33 journaled therein for breaking up the dry granular substance D in the hopper. Immediately below the agitator paddle 33 is an orificed plate 34 adjacent which an orificed gate 35 is slidably arranged so that by adjustment of the orificed gate relative to orifice in the plate 34, measured quantities of the dry granular substance D will fall into the aft zone of the mixing chamber 15.

When the mixing chamber 15 (jacket 23) the intake manifold 22 is extended forwardly and supported substantially between the bottom 24 and cover 29 of the jacket. In this connection the manifold 22 consists of a length of pipe 36 having one threaded end extending through the aft wall 27 and secured thereto by a pair of nuts 37. The opposite end of the pipe 36 terminates in the fore region of the chamber 15 and has a T fitting 38 secured thereto with the T branch thereof disposed vertically. Each end of the T branch of the fitting 38 has a nipple 39—39' secured thereto and each nipple is welded to a cross head 40—40', respectively. These cross heads 40—40' extend transversely of the chamber 15 in the fore region thereof and each has a discharge tube 41—42, 41'—42' respectively, secured thereto for discharging fluid therefrom rearwardly within the chamber 15.

In the case of the lowermost set of discharge tubes 41—42, each of them extends through a baffle plate 43 secured to the bottom 24 as well as the side walls 25 of the jacket. This baffle plate 43 leans slightly forward within the jacket 23 and serves to retain water therein to a level up to its upper edge 44 which is slightly below the pipe 36 constituting the main branch of the manifold 22. From the foregoing it will be seen that a lower mixing pan 45 is provided within the chamber 15.

In conjunction with the foregoing, an upper mixing pan 46 is provided above the intake manifold 22. This upper pan 46 is supported on a cross strap 47 secured to the pipe 36 and has a fore wall 48 provided with angle clips 49 secured by bolts 50 to the side walls 25 of the jacket 23. This fore wall 48 has openings 51 through which the discharge tubes 41'—42' extend from the upper cross head 40' of the manifold. The opposite end of the pan 46 is provided with a vertical wall 52 which extends slightly beyond half way to the stationary cover 29 and is spaced inwardly of the aft wall 27. It will thus be seen that the upper pan 46 extends completely across the jacket 23 below the discharge throat 32 of the hopper 16 to receive a metered or measured quantity of the dry granular substance D therefrom.

It should be noted further that the upper pan 46 is closed off relative to the fore zone of the chamber 15 by the high bore wall 48 on the pan but is only dammed at its opposite end by the half high vertical wall 52 which is in spaced relation to the aft wall 27 of the jacket 23.

Since the stationary cover 29 only overlies the intake end or zone of the chamber 15 it will be apparent that the fore zone thereof is ordinarily open to provide access thereto. This fore zone, however, is closed by a removable lid 53 (Fig. 3). The removable lid 53 has a downturned flange on three sides to embrace the side walls 25 as well as the fore wall 26 of the jacket. The aft end of the lid 53 is provided with a downwardly offset lip 54 which fits under the fore edge of the stationary cover 29. A pair of spring latches 55 are provided on the fore wall 26 of the jacket for holding that end of the removable lid 53 down upon the jacket.

The extreme forward part of the fore zone i. e., ahead of the baffle plate 43, has a discharge port 56 formed through the bottom 24 of the jacket 23. This discharge port 56 is substantially centrally located between the side walls 25 of the jacket 23 and is in communication with a spout 57 which is welded to the bottom wall 24 so as to extend diagonally downward therefrom as best seen in Fig. 3. The free end 58 of the spout 57 is threaded for connection to a pipe or hose coupling 59 for conducting the fluid discharge to a desired point or place.

Under conditions where the source of water W is the entrance flume of an irrigation system, the discharge from the chamber 15 would be by way of a hose or pipe into the initial irrigation ditch or trench in a field. Should it be necessary to elevate the water W discharging from the spout 57 to a ditch or trench at a higher level, a booster pump 60 is employed. This is illustrated diagrammatically in Fig. 7 wherein the hose or pipe 61 coupled to the spout 57 enters the intake side of the booster pump 60 for discharge therefrom at a greater pressure. In the illustration of Fig. 7 it is presumed that the influx of water from the source W via the suction pump 14 is forced into the manifold 22 at approximately 20# pressure at a rate of about 14 gallons per minute. As previously stated, this could be normal city pressure of from 30 to 40# by a direct line from a municipal or community water supply in which case the suction pump 14 could be eliminated.

In either of the foregoing situations, if the booster pump 60 is employed it should develop a speed of flow slightly greater than the normal input at the manifold 22 to avoid back pressure or flooding of the mixing chamber 15. In the case of an input of about 14 gallons per minute at 20# pressure as above explained, I prefer that the booster pump 60 discharge the flowage at a rate of say 16 gallons per minute at about 75# pressure. This has been found suitable for supplying the treated water to a sprinkler system 62 for discharge in a spray from nozzles 63. The same pressure (75#) is equally suitable for spraying systems for spraying fruit trees and vegetables with fungicides or insecticides. This pressure is also suitable for pumping the treated water up hill or into a standpipe 65 as illustrated in Fig. 8 for creating a water level above irrigation ditches or trenches on hillsides.

Coming now to the operation of the applicator 10 and the manner in which the water soluble material is admixed with the normal flow of water through the mixing chamber 15, let us refer to Figs. 3, 4 and 5 as well as Figs. 1 and 7. The motor 13 is drivingly connected to the shaft of the agitator paddle 33 by the usual belt and pulley connections at the desired ratio to assure admittance of the substance D from the hopper 16 to the gate 35 in the throat 32. The gate 35 is set with its orifice lapping the orifice of the orificed plate 34 to allow the desired or metered quantity of the substance D to fall by gravity into the upper pan 46.

It should here be understood that the water forced into the manifold is divided for discharge via the four discharge tubes, the two lower ones 41—42 discharging into the lower pan 45 and the two upper ones 41'—42' discharging into the upper pan 46. Referring now to Fig. 4 it will be noted that the four discharge tubes are inclined downwardly toward the bottom of the pan with which they are associated. In this manner the column of water discharging from a tube fans out upon striking the bottom of the pan. Thus it will be seen by the directional arrows $a$ that the jet of water discharging from the tubes 41'—42' flows along the bottom of the upper pan 46 and flares out as the water rushes toward the aft wall or dam 52. Thence the flow is diverted upwardly as well as turned back toward the fore wall 48 of the upper pan. Since the flow is at least 14 gallons per minute it will be obvious that the substance D metered into the upper pan 46 is picked up with the turbulence set up in the pan 46.

The foregoing should be considered with the flow arrows $a$ in Fig. 3 wherein it will be noted that the current has an up flow while returning toward the fore wall 48. This up flow, when passing over the inward jet of water at the discharge tube 41' or 42', sets up a whirlpool $x$ at the adjacent forward corner of the pan 46. Thus the substance D taken on is dissolved while being subjected to the turbulence of the water within the pan 46. The flow within the pan 46 is in an upstream direction and therefore although heavier particles of the substance D tend to sink they are constantly agitated and worn away by attrition and ultimately dissolved for admixture with the water flowing into the upper pan 46.

Since the water discharges into the pan 46 along its bottom and swirls back toward the fore wall 48 thereof it will be apparent that the flow is upwardly until it overflows the dam 52 at the aft end of the pan 45. This overflow spills down into the aft end of the lower pan 45 and merges with the turbulent water in the lower pan. Consequently even though all particles or granules of the substance D are not thoroughly dissolved while in the upper pan 46 they are subjected to further agitation and attrition while in the lower pan 45.

The action of the water within the lower pan 45 is somewhat similar to that occurring in the upper pan 46 excepting for the difference created by reason of the runoff at the fore end of the pan 45 instead of over the aft end as in the case of the upper pan 46. Thus it will be seen from the flow arrows a' in Fig. 3 that the incoming water fans out and runs along the bottom 24 of the jacket 23 to pick up any settled particles of substance D. In this connection, see also the flow arrows a' in Fig. 5 and how they are diverted back toward the baffle plate 43 at the fore end of the pan 45. Taken together (Figs. 3 and 5) it will be apparent that the back flow in the lower pan 45 is upward and that the body of water builds up at the baffle plate 43 at a substantially higher level than at the aft wall 27 of the lower pan.

As a result of the foregoing phenomenon the baffle plate 43 is preferably tilted forwardly to minimize backward diversion of the flow and to allow the stream to spill over the upper edge of the baffle plate 43 with lesser resistance than would occur were the baffle 43 vertically disposed. Another occurrence within the lower pan worthy of mention is the fact that the water tends to build up and rise higher in the triangular regions y and y' at the fore corners of the lower pan. In this connection there is provided a gate means 66 in the baffle plate 43 adjacent each of these triangular zones y and y'. These gates 66 which are identical consist of an elongated slot 67 cut through the baffle plate 43 on an axis aligned with a pivot pin 68 on which a lever 69 is pivotally mounted. This lever 69 is so disposed as to rock entirely over the slot 67 to close the same or partially thereover to limit the flow of water therethrough. As seen in Fig. 5, both of the levers 69 are out of register with their respective slots 67 to permit full flow of water through the slots 67 and minimize the pile up of water within the triangular zones y or y'.

The water spilling over the baffle plate 43 as well as through the gates 66 enters the fore zone of the chamber thoroughly admixed with the substance D which was metered into the same. The water then discharges through the port 56 for conveyance to an irrigation ditch or if through the booster pump 60 then into a sprinkler line or spray system as the case may be.

From the foregoing it will be seen that I have provided a simple yet effective portable applicator by which either dry or liquid substances D can be admixed with a flow of water for even distribution with the same in irrigation ditches, spray or sprinkler systems and the like. More particularly the present invention embodies a novel mixing chamber into which additive substances are metered and thoroughly agitated with and by the flowage of water for carriage thereby to the desired mode of discharge.

While I have described my new applicator and the novel mixing chamber thereof in specific detail, it will be apparent to those skilled in the art that various modifications, changes and/or alterations may be made without departing from the spirit of the invention. I therefore desire to avail myself of all modifications, alterations and/or variations as fairly come within the purview of the appended claims.

What I claim as new and desire to protect by Letters Patent is:

1. In an applicator for admixing water soluble substances with a flow of water for dilution therein and application therewith to irrigation, spraying and/or sprinkling systems; a mixing chamber comprising a jacket closed on all sides top and bottom, a baffle plate on the bottom of said jacket and extending across the same adjacent the fore end thereof, a manifold in said jacket having discharge tubes extending through said baffle plate for discharging jets of water downwardly and rearwardly toward the bottom and aft wall of said jacket for back flow in turbulence toward said baffle plate, means for supplying water under normal pressure to said manifold, a discharge port in the bottom of said jacket forwardly of said baffle plate for discharging treated water overflowing said baffle plate from said jacket, and a conduit communicating with said discharge port for conveying said treated water to a desired place of use.

2. In an applicator for hopper supplied water soluble fertilizers, fungicides and insecticides, a mixing chamber comprising an elongated jacket having a throat formation in its cover adjacent its aft wall communicating with the lower end of said hopper, an orificed gate on said throat for metering the flow of water soluble substance from said hopper into the aft region of said jacket, a baffle plate secured to the bottom of said jacket and crosswise the same slightly rearwardly of the fore wall of said jacket to provide a pan in the aft zone of said jacket, a manifold in said chamber, means for supplying water under normal pressure to said manifold, said manifold having discharge jets extending through said baffle plate adjacent the bottom of said jacket for discharging streams of water along the bottom of said pan and for creating a turbulence in said water prior to spilling thereof over said baffle plate, a discharge port formed in the bottom wall of said jacket ahead of said baffle plate for discharging treated water spilling over said baffle from said chamber, a spout communicating with the port formed in the bottom wall of said jacket, and a conduit coupled to said spout for conveying the treated water therefrom to a desired place of use.

3. In an applicator for admixing water soluble substances with a flow of water for dilution therein and application therewith to irrigation, spraying and/or sprinkling systems; a mixing chamber comprising a jacket closed on all sides top and bottom, a baffle plate extending across the bottom of said jacket adjacent the fore end thereof to provide a lower pan in the jacket, an upper pan in said jacket having a closed fore wall and partial wall at its aft end spaced from the aft wall of said jacket, a manifold in said jacket between said upper and lower pans and between the closed fore wall of said upper pan and the fore wall of said jacket, a pair of discharge tubes extending through the fore wall of said upper pan, a pair of discharge tubes extending through said baffle plate of said lower pan, each of said jets being inclined for discharging jets of water along the floor of each said pan for creating a turbulence in said water toward said baffle plate, means for supplying water under normal pressure to said manifold, a source of supply of water soluble substance, an orificed gate in the upper wall of said jacket for metering the flow of water soluble substance from said source of supply thereof into said upper pan to be picked up by the turbulent water therein prior to overflow over said partial aft wall into said lower pan and further dilution with the turbulent water in the lower pan and overflowing said baffle plate, a discharge port in the bottom of said jacket forwardly of said baffle plate for discharging treated water overflowing said baffle plate from said jacket, and a conduit communicating with said discharge port for conveying said treated water to a desired place of use.

4. In an applicator for admixing water soluble substances with a flow of water for dilution therein and application therewith to irrigation, spraying and/or sprinkling systems, a mixing chamber comprising a closed jacket having an upper pan for receiving the metered discharge of said substance and a lower pan for receiving overflow from said upper pan including an inclined baffle secured to the bottom of said jacket rearwardly its fore wall, means for discharging jets of water downwardly and rearwardly along the bottom of said upper pan as well as the bottom of said lower pan whereby each jet of water fans out creating a turbulence pool of water in each said upper and lower pan, and a discharge spout communicating with said jacket between said baffle plate and the fore wall of said jacket.

5. In an applicator for admixing water soluble substances with a flow of water for dilution therein and application therewith to irrigation, spraying and/or sprinkling systems; a mixing chamber comprising a closed jacket having an upper pan for receiving the metered discharge of said substance and a lower pan for receiving overflow from said upper pan including an inclined baffle secured to the bottom of said jacket rearwardly its fore wall, a pair of water discharging jets at the fore end of said upper pan as well as said lower pan, each said jet being inclined downwardly and rearwardly whereby the column of water discharging therefrom fans out along the bottom of the pan associated therewith for creating a turbulent pool of water in each said upper and lower pan, gate means on said baffle plate for controlling the flow of treated water from said lower pan into the fore end of said jacket, and a discharge spout communicating with said jacket between said baffle plate and the fore wall of said jacket.

6. In an applicator for admixing water soluble substances with a flow of water for dilution therein and application therewith to irrigation, spraying and/or sprinkling systems; a mixing chamber comprising a closed jacket having an upper pan for receiving the metered discharge of said substance and a lower pan for receiving overflow from said upper pan including an inclined baffle secured to the bottom of said jacket rearwardly its fore wall, a pair of water discharging jets extending through the fore end of said upper pan as well as said baffle at the fore end of said lower pan, each said jet being inclined downwardly and rearwardly whereby the column of water discharging therefrom fans out along the bottom of the pan with which said jet is associated for creating a turbulent pool of water in each said upper and lower pan, gate means on said baffle plate comprising slotted openings formed at each end thereof adjacent the side walls of said jacket and a lever pivotally mounted on said baffle plate adjacent each slot formed therein for movement into and out of register with such slot for controlling the flow of treated water from said lower pan into the fore end of said jacket, and a discharge spout communicating with said jacket between said baffle plate and the fore wall of said jacket.

References Cited in the file of this patent
UNITED STATES PATENTS

| | | |
|---|---|---|
| 1,864,947 | Selfridge | June 28, 1932 |
| 2,038,667 | Neff | Apr. 28, 1936 |
| 2,603,460 | Kalinske | July 15, 1952 |